US012735361B2

(12) United States Patent
Zhang et al.

(10) Patent No.: US 12,735,361 B2
(45) Date of Patent: Sep. 15, 2026

(54) CERAMIC MATERIAL OF CERAMIC ELECTRODE FOR TUMOR TREATING FIELDS AND PREPARATION METHOD THEREOF

(71) Applicant: HEBEI PUNI MEDICAL TECHNOLOGY CO., LTD, Shijiazhuang (CN)

(72) Inventors: Jianyi Zhang, Shijiazhuang (CN); Shengjun Liu, Shijiazhuang (CN); Hongjie Duan, Shijiazhuang (CN)

(73) Assignee: HEBEI PUNI MEDICAL TECHNOLOGY CO., LTD, Shijiazhuang (CN)

(*) Notice: Subject to any disclaimer, the term of this patent is extended or adjusted under 35 U.S.C. 154(b) by 405 days.

(21) Appl. No.: 18/592,832

(22) Filed: Mar. 1, 2024

(65) Prior Publication Data

US 2024/0254052 A1 Aug. 1, 2024

Related U.S. Application Data

(63) Continuation of application No. PCT/CN2022/085815, filed on Apr. 8, 2022.

(30) Foreign Application Priority Data

Sep. 6, 2021 (CN) ........................ 202111036962.9

(51) Int. Cl.
*C04B 35/468* (2006.01)
*C04B 35/626* (2006.01)
(Continued)

(52) U.S. Cl.
CPC ...... *C04B 35/4682* (2013.01); *C04B 35/6261* (2013.01); *C04B 35/62695* (2013.01);
(Continued)

(58) Field of Classification Search
None
See application file for complete search history.

(56) References Cited

FOREIGN PATENT DOCUMENTS

CN 103964845 A * 8/2014
CN 106946569 B * 5/2020 ........... C04B 35/472
CN 112457011 A * 3/2021 ......... C04B 41/5116

OTHER PUBLICATIONS

International Search Report of PCT Patent Application No. PCT/CN2022/085815 issued on Jun. 23, 2022.

(Continued)

*Primary Examiner* — Mohammad M Ameen

(57) ABSTRACT

The invention relates to a method for preparing ceramic material of ceramic electrode for tumor treating fields, which comprises the following steps of: synthesizing $a[0.67Bi_{0.995}Ce_{0.005}FeO_3\text{-}0.33BaTiO_3]\text{-}b[Sr_{1-x}Pb_xTi_{1-y}Zr_yO_3]\text{-}c[Pb(Mg_{1/3}Nb_{2/3})O_3]$ powder by a solid phase method; Where $0<a<0.06$, $0.05<b<0.18$, $a+b+c=1$; $0.6\leq x\leq 0.8$, $0<y<0.2$; Fine grinding the powder, adding a binder, granulating, and pressing for forming to obtain a biscuit; Removing organic substances in the biscuit; Sinter that biscuit to obtain the ceramic material. The invention also provides a ceramic material prepared by the preparation method, which has the characteristics of high dielectric constant and low loss and is suitable for manufacturing a ceramic capacitor electrode for conducting an electric field but blocking conducting current.

10 Claims, 4 Drawing Sheets

(51) Int. Cl.
*C04B 35/634* (2006.01)
*C04B 35/645* (2006.01)
*C04B 41/00* (2006.01)

(52) U.S. Cl.
CPC .... *C04B 35/63416* (2013.01); *C04B 35/6455* (2013.01); *C04B 41/0072* (2013.01); *C04B 2235/3206* (2013.01); *C04B 2235/3229* (2013.01); *C04B 2235/3232* (2013.01); *C04B 2235/3244* (2013.01); *C04B 2235/3251* (2013.01); *C04B 2235/3272* (2013.01); *C04B 2235/3296* (2013.01); *C04B 2235/3298* (2013.01); *C04B 2235/6562* (2013.01); *C04B 2235/6567* (2013.01); *C04B 2235/96* (2013.01)

(56) References Cited

OTHER PUBLICATIONS

Eilon D. Kirson et al., Alternating electric fields arrest cell proliferation in animal tumor models and human brain tumors, PNAS, Jun. 12, 2007, pp. 10152-10157, vol. 104, No. 24.

* cited by examiner

CERAMIC MATERIAL OF CERAMIC ELECTRODE FOR TUMOR TREATING FIELDS AND PREPARATION METHOD THEREOF

CROSS-REFERENCE TO RELATED APPLICATION

The present application is a continuation application of PCT application No. PCT/CN2022/085815 filed on Apr. 8, 2022, which claims the benefit of Chinese Patent Application No. 202111036962.9 filed on Sep. 6, 2021. The contents of all of the aforementioned applications are incorporated by reference herein in their entirety.

TECHNICAL FIELD

The invention belongs to the technical field of functional ceramic materials, and particularly relates to ceramic material of ceramic electrode for tumor treating fields (TTF) and a preparation method thereof.

BACKGROUND ART

Biomedical research has shown that if an electric field is directly applied to the human body using metal electrodes, under the action of conductive current, the charged mineral ions in the cells of the human body will migrate, resulting in changes in the concentration of ions in the cells, which is harmful to the human body (PNAS, vol. 104, pp 10152-10157, 2007). In addition, because high conduction current is directly related to the life safety of the human body, the metal electrodes are used to apply an electric field for medical research and treatment, and the voltage cannot be too high, and the applied voltage is limited.

According to the principles of physics, pure capacitors are insulated for conducting current and conductive to AC electric field. Therefore, in the experiment of clinical application of AC voltage, if the AC voltage is applied using the insulated ceramic capacitors as electrodes, the conductive current in human body can be avoided, and the side effects of the conductive current on cells can be avoided. In addition, the electric field applied to the human body through the capacitive electrode in the general treatment is localized, and only localized regions are subjected to the electric field. And due to the insulating nature of the capacitor, no current is conducted through the body area to which the electric field is applied. Application of an electric field treatment using an insulated capacitor electrode has a higher safety relative to a metal conductor electrode, and a higher voltage can be applied.

Biomedical experiments have demonstrated that the application of an alternating voltage through an insulated capacitor electrode at a specific AC frequency can effectively inhibit the growth of specific abnormal cells (PNAS, vol. 104, pp 10152-10157, 2007). Under specific electric field frequencies, the electric field can effectively inhibit the growth of tumor cells in the brain of animals and humans. Experiments show that the higher the applied voltage, the better the treatment effect. But the voltage applied to the treatment is limited by the locally prescribed safe voltage. In clinical treatment, the applied voltage must be lower than the locally specified safe voltage due to safety requirements. The purpose is to prevent the occurrence of safety accidents once short-circuited. Therefore, on the premise that the applied voltage is limited, as the capacitive reactance of the capacitor is inversely proportional to the dielectric constant of the capacitor material, the capacitive reactance of the electrode made of the dielectric material with high dielectric constant is smaller. The voltage drop across the electrodes will be smaller. In this way, under the premise of certain safe voltage, the voltage applied to the head of the patient is higher, the treatment effect will be better. In addition, the capacitor material with high dielectric loss will generate heat under the electric field, affecting the operation of the capacitor electrode, and has the risk of heating and scalding patients. Therefore, by adopting the material with high dielectric constant and low loss, the electric field can be more effectively applied to the specific part of human body or animal directly needing research or treatment through the capacitor electrode sheet with low capacitive reactance. Based on the above application background, it is extremely urgent to find the dielectric material with high dielectric constant and low loss and make the capacitor electrode with low capacitive impedance and low loss to block the conduction current and conduct the electric field to realize different applications.

(1-x)PMN-xPT [(1-x)$Pb(Mg_{1/3}Nb_{2/3})O_{3-x}PbTiO_3$] (x<1) is a ferroelectric material with a high dielectric constant. However, for the synthesis of materials in this system, if one-step synthesis is adopted, the pyrochlore impurity phase is easily obtained and the performance is deteriorated. In order to obtain single-phase materials with perovskite structure with good performance, two-step synthesis is generally required. In the first step, $MgNb_2O_6$ is synthesized at the temperature above 1000 deg c, and then $MgNb_2O_6$ is used as a part of raw materials to be mixed with other oxide raw materials for a second synthesis at the temperature above 800 deg c, and finally PMN-PT ceramic powder with a perovskite structure is obtained. The problem is that the two-step synthesis has complicated working procedures, long working hours and high energy consumption. In addition, among the studies on PMN-xPT, a large number of studies have focused on the quasi-smectic-phase-bound component (1-x)PMN-xPT, where x=0.3 to 0.4, but the quasi-smectic-phase-bound component is only suitable for piezoelectric applications and not for high-dielectric capacitors.

SUMMARY OF THE INVENTION

The invention provides a preparation method of ceramic material of ceramic electrode for tumor treating fields, and the ceramic material and the element prepared by the method.

As a first aspect of the present invention, there is provided a method for preparing ceramic material of ceramic electrode for tumor treating fields, the preparation method comprising the steps of:

1) $a[0.67Bi_{0.995}Ce_{0.005}FeO_3\text{-}0.33BaTiO_3]\text{-}b[Sr_{1-x}Pb_x Ti_{1-y} Zr_yO_3]\text{-}c[Pb(Mg_{1/3}Nb_{2/3})O_3$ is synthesized in one step by a solid phase method, wherein 0<a<0.06, 0.05<b<0.18 and A+B+C=1; 0.6≤x≤0.8, 0<y<0.2;

$a[0.67Bi_{0.995}Ce_{0.005}FeO_3\text{-}0.33BaTiO_3]\text{-}b[Sr_{1-x}Pb_xTi_{1-y} Zr_yO_3]\text{-}c[Pb(Mg_{1/3}Nb_{2/3})O_3]$ powder is synthesized by taking $Bi_2O_3$, $CeO_2$, $Fe_2O_3$, $BaCO_3$, $TiO_2$, $SrCO_3$, $Pb_3O_4$, $ZrO_2$, MgO, $Nb_2O_5$ as raw materials under the temperature of 750 DEG C. to 850 DEG C. for 4 hours; Where 0<a<0.06, 0.05<b<0.18, a+b+c=1; 0.6≤x≤0.8, 0<y<0.2;

2) carrying out fine grinding on the $a[0.67Bi_{0.995}Ce_{0.005}FeO_3\text{-}0.33BaTiO_3]\text{-}b[Sr_{1-x}Pb_xTi_{1-y} Zr_yO_3]\text{-}c[Pb(Mg_{1/3}Nb_{2/3})O_3]$ powder synthesized in the step 1), adding a binder for granulation after fine grinding, and carrying out compression molding to obtain a biscuit;

3) performing plastic discharge to remove organic substances in the biscuit;

And 4) sinter that biscuit to obtain a ceramic material.

As a preferred technical solution, the step 1) is specifically as follows:

Taking $Bi_2O_3$, $CeO_2$, $Fe_2O_3$, $BaCO_3$, $TiO_2$, $SrCO_3$, $Pb_3O_4$, $ZrO_2$, MgO, $Nb_2O_5$ as raw materials, proportioning according to the stoichiometric ratio of $a[0.67Bi_{0.995}Ce_{0.005}FeO_3\text{-}0.33BaTiO_3]\text{-}b[Sr_{1-x}Pb_xTi_{1-y}Zr_yO_3]\text{-}c[Pb(Mg_{1/3}Nb_{2/3})O_3]$ and mixing by a wet ball milling method;

Dry that mixed material;

Keeping the temperature for 4 hours at the temperature of between 750 and 850 DEG C., and carrying out one-step synthesis to obtain$[0.67Bi_{0.995}Ce_{0.005}FeO_3\text{-}0.33BaTiO_3]\text{-}b[Sr_{1-x}Pb_xTi_{1-y}Zr_yO_3]\text{-}c[Pb(Mg_{1/3}Nb_{2/3})O_3]$ powder, wherein $0<a<0.06$, $0.05<b<0.18$ and $A+B+C=1$; $0.6\leq x\leq 0.8$, $0<y<0.2$.

As a preferred technical solution, in that step 2), the mas of the ceramic powder, the grin ball and the deionized water is as follows:

Ceramic powder: grinding ball: deionized water=1:(1.8-2):(0.6-0.8).

As a preferred technical solution, the fine grinding time is in the range of 24 to 48 hours.

As a preferred technical solution, that abrasive ball is a zirconia ball.

As a preferred technical solution, in said step 2) that bind used is PVA; the addition amount of the binder is 5-8% of the mass of the ceramic powder.

As a preferred technical solution, in that step 3), the temperature of the plastic discharge is 550-760 deg c, and the heat preservation time is 2-3 hour.

As a preferred technical solution, the step 4) is specifically as follows:

The biscuit is put into a crucible for close sintering, that sinter temperature is 1185-1250 deg c, the heating rate is 2 deg c/min-5 deg c/min, and the heat preservation time is 2-3 hours.

As a second aspect of the present invention, there is provided ceramic material of ceramic electrode for tumor treating fields, which is prepared by the aforementioned preparation method.

As a preferred technical solution, the ceramic material has a relative dielectric constant great than 20,000 and a dielectric loss less than 0.0217 at room temperature when the frequency is in the range of 1 khz to 1 mhz.

Compared with the prior art, the invention has the following effects:

In the invention, based on a quaternary system $BiFeO_3$—$BaTiO_3$—$Pb(Mg_{1/3}Nb_{2/3})O_3$—$PbTiO_3$, the characteristics of low melting point, high polarization and perovskite structure of bifeo3 are utilized, and modified PMN-PT-based ceramics with perovskite structure are directly synthesized by a one-step method. An appropriate amount of $BaTiO_3$ component and Ce doping are introduced to avoid miscellany and obtain high resistance. Introducing a proper amount of Sr and Zr is considered from the compound doping of a position and b position, so as to further reduce the long-range order and stability of the ferroelectric spontaneous polarization and obtain high polarization activity, A one-step synthesis of the target component $0.67Bi_{0.995}Ce_{0.005}FeO_3\text{-}0.33BaTiO_3]\text{-}b[Sr_{1-x}Pb_xTi_{1-y}Zr_yO_3]\text{-}c[Pb(Mg_{1/3}Nb_{2/3})O_3]$ with $0<a<0.06$, $0.05<b<0.18$, $a+b+c=1$ was achieved at room temperature with a high dielectric constant and low loss. $0.6\leq x\leq 0.8$, $0<y<0.2$.

The preparation method for ceramic material of ceramic electrode for TTF provided by the invention integrates the advantages of ferroelectric and dielectric compounds, $BiFeO_3$, $SrTiO_3$, $Pb(Mg_{1/3}Nb_{2/3})O_3$, $BaTiO_3$, $PbTiO_3$, $PbZrO_3$. It has many advantages, such as spontaneous polarization optimization, low loss, high dielectric constant and low synthesis temperature. By optimizing the doping elements and proportion, as well as the specific operation of each step of the preparation method, a dielectric ceramic material with high dielectric constant and low dielectric loss was obtained by one-step synthesis method, which made outstanding contributions to the preparation of capacitor electrodes for blocking the conduction electric field of conductive circuits required by biomedical research and clinical application for the field of tumor treating fields (TTF).

DRAWINGS

Other features, objects, and advantages of the present invention will become more apparent upon reading the detailed description of non-limiting embodiments made with reference to the following drawings.

DETAILED DESCRIPTION OF THE INVENTION

Figure 1:
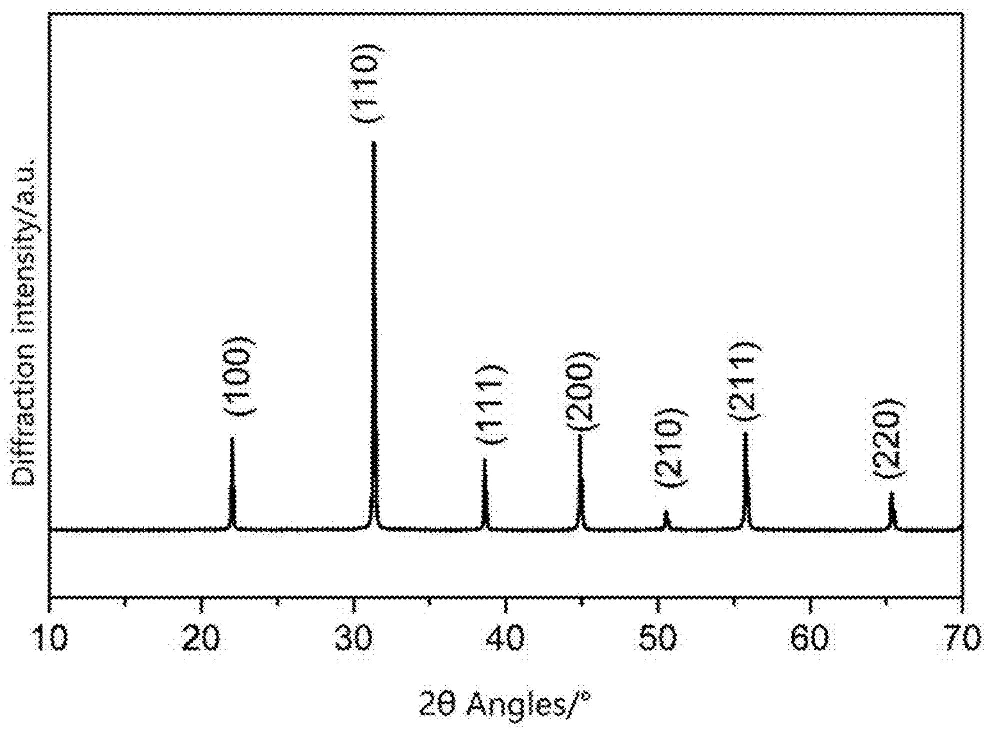
FIG. 1 is an XRD pattern of a ceramic material prepared by the method for preparing ceramic material of ceramic electrode for TTF provided by the invention.

The preparation method of ceramic material of ceramic electrode for TTF provided by the invention comprises the following steps:

Step S101

$a[0.67Bi_{0.995}Ce_{0.005}FeO_3\text{-}0.33BaTiO_3]\text{-}b[Sr_{1-x}Pb_xTi_{1-y}Zr_yO_3]\text{-}c[Pb(Mg_{1/3}Nb_{2/3})O_3$ was synthesized in one step by a solid phase method. Where $0<a<0.06$, $0.05<b<0.18$, $a+b+c=1$; $0.6\leq x\leq 0.8$, $0<y<0.2$.

Specifically:

Firstly, $Bi_2O_3$, $CeO_2$, $Fe_2O_3$, $BaCO_3$, $TiO_2$, $SrCO_3$, $Pb_3O_4$, $ZrO_2$, MgO, $Nb_2O_5$ are taken as raw materials and prepared according to the stoichiometric ratio of $a[0.67Bi_{0.995}Ce_{0.005}FeO_3\text{-}0.33BaTiO_3]\text{-}b[Sr_{1-x}Pb_xTi_{1-y}Zr_yO_3]\text{-}c[Pb(Mg_{1/3}Nb_{2/3})O_3]$; Subsequently, mixing materials by a wet ball milling method; Then dry that mixed material; Finally, preserving the temperature for 4 hours at the temperature of between 750 and 850 deg c to obtain $a[0.67Bi_{0.995}Ce_{0.005}Fe_3\text{-}0.33BaTiO_3]\text{-}b[Sr_{1-x}Pb_xTi_{1-y}Zr_yO_3]\text{-}c[Pb(Mg_{1/3}Nb_{2/3})O_3$ powder; Where $0<a<0.06$, $0.05<b<0.18$, $a+b+c=1$; $0.6\leq x\leq 0.8$, $0<y<0.2$.

Step S102

Fine grinding the $a[0.67Bi_{0.995}Ce_{0.005}FeO_3\text{-}0.33BaTiO_3]\text{-}b[Sr_{1-x}Pb_xTi_{1-y}Zr_yO_3]\text{-}c[Pb(Mg_{1/3}Nb_{2/3})O_3]$ powder synthesized in step S101, adding a binder, granulating, and press molding to obtain a green body. Preferably, the binder used is PVA. The addition amount of the binder is 5 to 8 percent of the mass of the ceramic powder, for example, 5 percent, 6 percent or 8 percent. When the ceramic powder particle size is larger, the amount of binder added is less. When the ceramic powder particle size is smaller, the amount of binder added is more.

Preferably, the wet ball milling is adopted when the powder is finely ground, wherein the qualities of the ceramic powder, the grinding ball and the deionized water are as follows: ceramic powder, the grinding ball and the deionized water=1:(1.8-2):(0.6-0.8). In order to obtain a more appropriate particle size of the ground powder, it is preferable that the ceramic powder: grinding ball: deionized water=1:1.8:0.6.

Preferably, the fine grinding time is 24 to 48 hours. For example: 24 hours, 36 hours or 48 hours.

Preferably, the grinding balls are zirconia balls and are more suitable for fine grinding the synthesized ceramic powder.

Step S103

Performing plastic discharge on the biscuit obtained in step S102 to remove organic substances in the biscuit. Preferably, the temperature of the discharge molding is 550. degree. c. to 760. degree. c., for example 550. degree. c. or 700. degree. c. The incubation time require for that plastic discharge process is 2 to 3 hour, preferably 2.5 hours.

Step S104

The green body excluding organic substances obtained in step S103 is sintered to obtain a ceramic material. Further, putting the biscuit excluding organic substances into a crucible for closed sintering at 1185-1250 deg c, for example 1185 deg c, 1225 deg c or 1250 deg c. The temperature increase rate is from 2. degree. C./min to 5. degree. C./min, for example, 2. degree. C./min, 3. degree. C./min or 5. degree. C./min. The incubation time is 2 to 3 hour, for example 2 or 3 hours.

the invention also provides a ceramic material prepared by the preparation method provided by the invention, and the chemical composition of the ceramic material is in accordance with a chemical general formula $a[0.67Bi_{0.995}Ce_{0.005}FeO_3\text{-}0.33BaTiO_3]\text{-}b[Sr_{1-x}Pb_xTi_{1-y}Zr_yO_3]\text{-}c[Pb(Mg_{1/3}Nb_{2/3})O_3$; Where $$0<a<0.06,$$

$$0.05<b<0.18,$$

-continued $$a+b+c=1;$$

$$0.6\leq x\leq 0.8,$$

$$0<y<0.2.$$

Preferably, the ceramic material is capable of sintering at 1185 c to 1250 c, e. g., 1185 c, 1225 c or 1250 c. The relative dielectric constant of that ceramic material is great than 20,000 and the dielectric loss is less than 0.0217 when the frequency is in the range of 1 khz to 1 mhz at room temperature.

By using the electric field applied by the capacitive electrode, the conductive current can be blocked in biomedical research and clinical experiments, but the conditions for conducting the electric field can be met, and the ceramic electrode is suitable for tumor electric field therapy.

The technical scheme provided by the invention is further explained below with two specific examples and five comparative examples.

Example 1

The ceramic material comprise that following component: $0.01[0.67Bi_{0.995}Ce_{0.005}FeO_3\text{-}0.33BaTiO_3]\text{-}0.06[Sr_{0.4}Pb_{0.6}Ti_{0.98}Zr_{0.02}O_3]\text{-}0.93]Pb(Mg_{1/3}Nb_{2/3})O_3$;

Firstly, one-step synthesis by a solid phase method:

The raw materials of $Bi_2O_3$, $CeO_2$, $Fe_2O_3$, $BaCO_3$, $TiO_2$, $SrCO_3$, $Pb_3O_4$, $ZrO_2$, MgO, $Nb_2O_5$ needed for calculation according to the chemical formula composition of $0.01[0.67Bi_{0.995}Ce_{0.005}FeO_3\text{-}0.33BaTiO_3]\text{-}0.06[Sr_{0.4}Pb_{0.6}Ti_{0.98}Zr_{0.02}O_3]\text{-}0.93[Pb(Mg_{1/3}Nb_{2/3})O_3]$.

a wet ball milling method is adopted for mixing materials, wherein the mass of the raw materials, the grinding balls and the deionized water is as follows:

Raw material: grinding ball: deionized water=1:1.8:0.8;

Mixing for 6-8 hours to uniformly mix the components.

Subsequently, dry and sieving aft drying. Preferably a 30 mesh screen.

The mixed materials were incubated at 800 C-810 C for 4 hours to synthesize $0.01[0.67Bi_{0.995}Ce_{0.005}FeO_3\text{-}0.33BaTiO_3]\text{-}0.06[Sr_{0.4}Pb_{0.6}Ti_{0.98}Zr_{0.02}O_3]\text{-}0.93[Pb(Mg_{1/3}Nb_{2/3})O_3$ powder.

Second, finely grinding $0.01[0.67Bi_{0.995}Ce_{0.005}FeO_3\text{-}0.33BaTiO_3]\text{-}0.06[Sr_{0.4}Pb_{0.6}Ti_{0.98}Zr_{0.02}O_3]\text{-}0.93[Pb(Mg_{1/3}Nb_{2/3})O_3$ powder, wherein the mass of raw materials, grinding balls and deionized water is as follows:

Raw material: grinding ball: deionized water=1:2:0.6;

Wet fine grin for 24 hours, discharge and drying;

Oven dry and sieving, preferably 40 mesh sieve to sieve that above mix raw materials.

PVA with the mass of 5%-8% of the mass of ceramic powder was added for granulation, and the powder was pressed and formed under the pressure of 200 MPa.

Third, the pressed green body is insulated at 650 DEG C. for 2 hours to eliminate organic substances in the green body, and the plastic discharge rate is not more than 3 DEG C./min.

Fourthly, place that plastic-discharged sample into an alumina crucible for closed sinter, covering a blank body with ceramic powder having the same component to prevent volatilization of the lead component, cover a grinding cap, increasing the temperature to 1215 deg c at the rate of 5 deg c/min, keeping the temperature for 2 hours, and cooling with a furnace to obtain a ceramic material sample.

Figure 2:
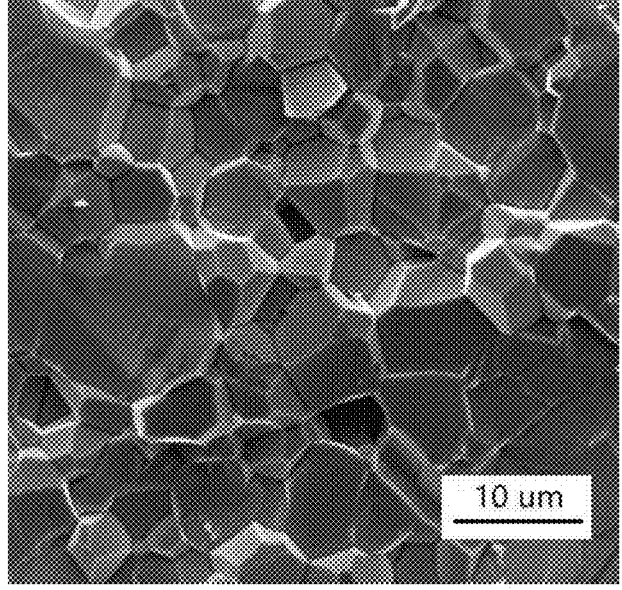
FIG. 2 is a fracture microstructure diagram of a ceramic material prepared by the method for preparing ceramic material of ceramic electrode for TTF provided by the invention.

Fifth, the sintered ceramic material was ground, washed, dried and the phase structure of the material was tested by X-ray crystallography. Test results referring to FIG. 1, the phase structure of the ceramic material of the present invention is a perovskite structure. The fracture surface was observed by a scanning electron microscope, and the results are shown in FIG. 2.

Sixth, grinding the sintered ceramic material, cleaning, drying, screen printing silver paste, drying, and putting into a van type electric furnace to burn silver. The silver-firing condition was maintained at 650. degree. c. for 30 minutes to obtain a ceramic sample of the present invention coated with an electrode.

Seventh, the sintered ceramic of the present invention was tested for dielectric properties and ferroelectric properties under a strong field. The dielectric properties were tested by precision LCR (Agilent 4284A, Agilent) and are presented in Table 3.

Example 2

The ceramic material composition is 0.05 $[0.67Bi_{0.995}Ce_{0.005}FeO_3$-$0.33BaTiO_3]$-0.16 $[Sr_{0.2}Pb_{0.8}Ti_{0.85}Zr_{0.15}O_3]$-$0.79[Pb(Mg_{1/3}Nb_{2/3})O_3$:

The preparation method of example 1 was repeated according to the composition formula of the above ceramic, and the obtained biscuit was sintered at 1225. degree. c. for 2 hours.

Figure 4:
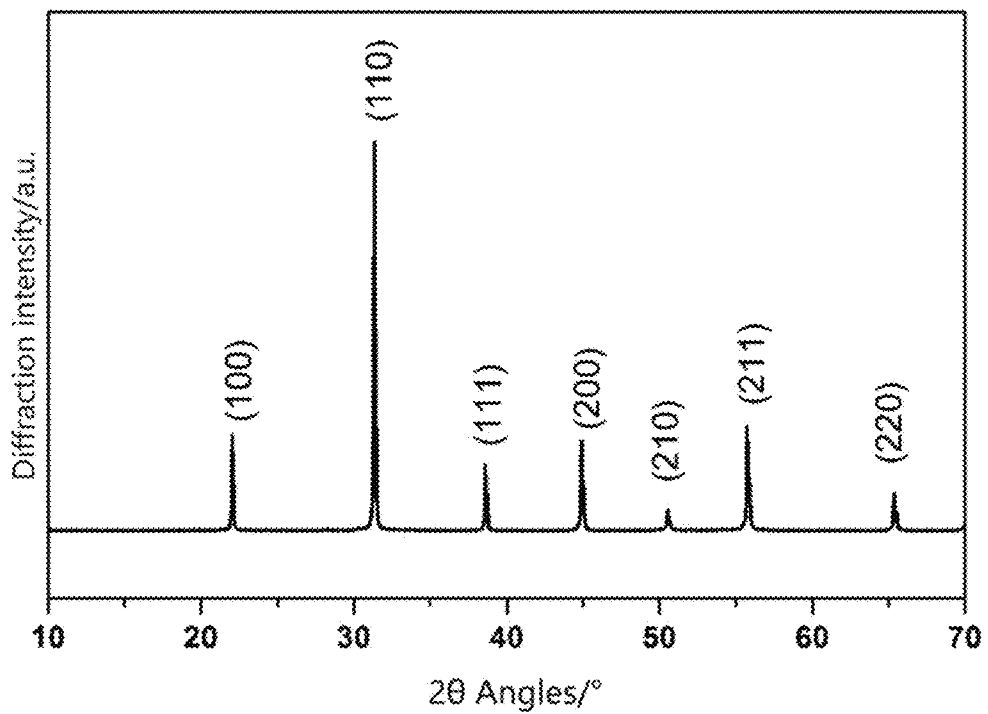
FIG. 4 is an XRD pattern of another ceramic material prepared by the method for preparing ceramic material of ceramic electrode for TTF provided by the present invention.
Figure 5:
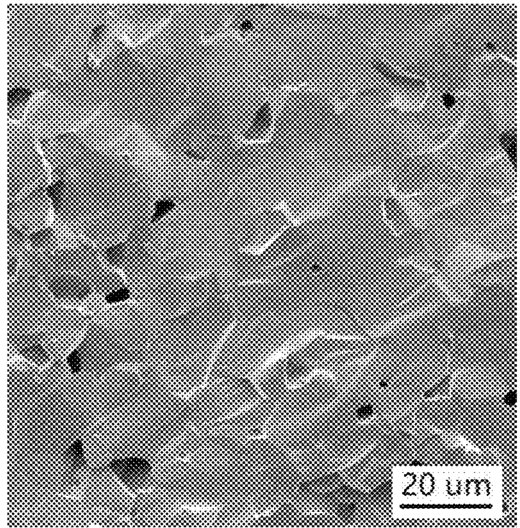
FIG. 5 is a fracture microstructure diagram of another ceramic material prepared by the method for preparing ceramic material of ceramic electrode for TTF provided by the invention.

Structural testing was performed on the ceramic sample, and the results are shown in FIG. 4. The crystal structure of the ceramic is of perovskite structure. The microstructure of the ceramic fracture is shown in FIG. 5.

The ceramic sheets were then subjected to dielectric properties, refer to table 3.

Comparative Example 1

Firstly, two-step synthesis by a solid phase method:

The raw materials of $Bi_2O_3$, $CeO_2$, $Fe_2O_3$, $BaCO_3$, $TiO_2$, $SrCO_3$, $Pb_3O_4$, $ZrO_2$, MgO and $Nb_2O_5$ needed for calculation according to the chemical formula composition of $0.01[0.67Bi_{0.995}Ce_{0.005}FeO_3$-$0.33BaTiO_3]$-0.06 $[Sr_{0.4}Pb_{0.6}Ti_{0.98}Zr_{0.02}O_3]$-$0.93[Pb(Mg_{1/3}Nb_{2/3})O_3]$.

Synthesis of $MgNb_2O_6$ in the first step: MgO, $Nb_2O_5$ raw material required for calculation according to the chemical formula composition of $MgNb_2O_6$.

A wet ball milling method is adopted for mixing materials, wherein the mass of raw materials, grinding balls and deionized water is as follows:

Raw material: grinding ball: deionized water=1:1.5:0.8;

Mix for 8 hours to mix the components evenly.

Drying and sieving after drying. The mixed raw materials were incubated at 1150 C for 2 hours to synthesize $MgNb_2O_6$.

Second Step Synthesis of $0.01[0.67Bi_{0.995}Ce_{0.005}FeO_3$-$0.33BaTiO_3]$-$0.06[Sr_{0.4}Pb_{0.6}Ti_{0.98}Zr_{0.02}O_3]$-$0.93[Pb(Mg_{1/3}Nb_{2/3})O_3$; the grinding balls and the deionized water is as follows:

$MgNb_2O_6$, $Bi_2O_3$, $CeO_2$, $Fe_2O_3$, $BaCO_3$, $TiO_2$, $SrCO_3$, $Pb_3O_4$ and $ZrO_2$ are taken as raw materials and mixed by a wet ball milling method, wherein the mass of the raw materials, the grinding balls and deionized water is taken as the raw materials: the grinding balls and the deionized water=1:1.8:0.8; Mixing for 6-8 hours to uniformly mix the components. Then dry and sieving aft drying. Preferably a 30 mesh screen.

The mixed materials were incubated at 835 C for 4 hours to synthesize $0.01[0.67Bi_{0.995}Ce_{0.005}FeO_3$-$0.33BaTiO_3]$-$0.06[Sr_{0.4}Pb_{0.6}Ti_{0.98}Zr_{0.02}O_3]$-$0.93[Pb(Mg_{1/3}Nb_{2/3})O_3$ powder.

Second, finely grinding $0.01[0.67Bi_{0.995}Ce_{0.005}FeO_3$-$0.33BaTiO_3]$-$0.06[Sr_{0.4}Pb_{0.6}Ti_{0.98}Zr_{0.02}O_3]$-$0.93[Pb(Mg_{1/3}Nb_{2/3})O_3$ powder, wherein the mass of the raw materials, the grinding balls and deionized water is as follows:

Raw material: grinding ball: deionized water=1:2:0.6;

Wet fine grin for 24 hours, discharge and drying;

Oven dry and sieving, preferably 40 mesh sieve to sieve that above mix raw materials.

PVA with the mass of 5%-8% of the powder mass was added for granulation, and the powder was pressed and formed under the pressure of 200 MPa.

Third, the pressed green compact was maintained at 650. degree. C. for 2 hours to exclude organic substances from the green compact and the plastic discharge rate was not more than 3. degree. C./min.

Fourth, the plastic-discharged sample was placed into an alumina crucible for closed sintering. In order to prevent the volatilization of the lead component, the green body was covered with powder having the same component, and a grinding cap was covered. The temperature was raised to 1215 C at a rate of 5 C/min for 2 hours, followed by furnace cooling to obtain the finished product.

Fifth, the sintered finished product was ground, washed, dried, sample tested, and the percentage of the perovskite phase was calculated by XRD (Table 1). The percent perovskite is calculated as follows:

$$\text{Perovskite Percentage} = \left[\sum I_{g(hkl)}\right] / \left[\sum I_{g(hkl)} + \sum I_{fg(hkl)}\right] * 100\%$$

Where (hkl) represent a crystal plane index; g represents a perovskite structure and fg represents a non-perovskite structure.

$\Sigma I_{g(hkl)}$ is the sum of the intensities of all the perovskite diffraction peaks in the XRD pattern.

$\Sigma I_{fg(hkl)}$ is the sum of the intensities of all non-perovskite diffraction peaks in the XRD pattern.

The ceramic dielectric properties were then tested using an LCR meter, refer to table 3.

Comparative Example 2

Firstly, one-step synthesis by a solid phase method:

The raw materials of $Bi_2O_3$, $CeO_2$, $Fe_2O_3$, $TiO_2$, $Pb_3O_4$, MgO and $Nb_2O_5$ required for calculation according to the chemical formula composition of $0.01[Bi_{0.995}Ce_{0.005}FeO_3$-$]$ $0.06[PbTiO_3]$-$0.93[Pb(Mg_{1/3}Nb_{2/3})O_3]$.

Awet ball milling method is adopted for mixing materials, wherein the mass of the raw materials, the grinding balls and the deionized water is as follows:

Raw material: grinding ball: deionized water=1:1.8:0.8;

Mixing for 6-8 hours to uniformly mix the components.

Subsequently, dried and sieved after drying. Preferably a 30 mesh screen.

the mixed raw materials are insulated for 4 hours at 800-810 deg c and synthesized $0.01[Bi_{0.995}Ce_{0.005}FeO_3]$-$0.06[PbTiO_3]$-$0.93[Pb(Mg_{1/3}Nb_{2/3})O_3$ powder.

Second, finely grinding $0.01[Bi_{0.995}Ce_{0.005}FeO_3]$-0.06 $[PbTiO_3]$-$0.93[Pb(Mg_{1/3}Nb_{2/3})O_3$ powder, wherein the mass of the raw materials, the grinding balls and the deionized water is as follows:

Raw material: grinding ball: deionized water=1:2:0.6;

Wet fine grin for 24 hours, discharge and drying;

Oven dry and sieving, preferably 40 mesh sieve to sieve that above mix raw materials.

PVA with the mass of 5%-8% of the powder mass was added for granulation, and the powder was pressed and formed under the pressure of 200 MPa.

Thirdly, the pressed green compact is insulated at 650 DEG C. for 2 hours to exclude organic substances in the green compact, and the plastic discharge rate is not more than 3 DEG C./min.

Fourth, the plastic-discharged sample was placed into an alumina crucible for closed sintering. In order to prevent the volatilization of the lead component, the green body was covered with powder having the same component, and a grinding cap was covered. The temperature was raised to 1215 C at a rate of 5 C/min for 2 hours, followed by furnace cooling to obtain the finished product.

Fifth, after the sintered finished product was ground, washed, dried, and subjected to sample test, the percentage of the perovskite phase was calculated using the XRD results, and no 100% perovskite phase was obtained (Table 1).

Comparative Example 3

Firstly, one-step synthesis by a solid phase method:

Raw materials required for calculation based on chemical formula composition of $0.01[0.67Bi_{0.995}Ce_{0.005}FeO_3$-$0.33BaTiO_3]$-$0.06[PbTiO_3]$-$0.93[Pb(Mg_{1/3}Nb_{2/3})O_3]$.

Raw materials: grinding ball: deionized water=1:1.8:0.8;

Mixing for 6-8 hours to uniformly mix the components.

Subsequently, dried and sieved. Preferably a 30 mesh screen.

The mixed raw materials were incubated at 800 C-810 C for 4 hours to synthesize $0.01[0.67Bi_{0.995}Ce_{0.005}FeO_3$-$0.33BaTiO_3]$-$0.06[PbTiO_3]$-0.93 $[Pb(Mg_{1/3}Nb_{2/3})O_3$ powder.

Second, fine grinding $0.01[0.67Bi_{0.995}Ce_{0.005}FeO_3$-$0.33BaTiO_3]$-$0.06[PbTiO_3]$-$0.93[Pb(Mg_{1/3}Nb_{2/3})O_3$ powder is performed, wherein the mass of the raw materials, the grinding balls and the deionized water is as follows:

Raw material: grinding ball: deionized water=1:2:0.6;

Wet fine grin for 24 hours, discharge and drying;

Oven dry and sieving, preferably 40 mesh sieve to sieve that above mix raw materials.

PVA with the mass of 5%-8% of the powder mass was added for granulation, and the powder was pressed and formed under the pressure of 200 MPa.

Thirdly, the pressed green compact is maintained at 650 DEG C. for 2 hours to eliminate organic substances in the green compact, and the plastic discharge rate is not more than 3 DEG C./min.

Fourth, the plastic-discharged sample was placed into an alumina crucible for closed sintering. In order to prevent the volatilization of the lead component, the green body was covered with powder having the same component, and a grinding cap was covered. The temperature was raised to 1215 C at a rate of 5 C/min for 2 hours, followed by furnace cooling to obtain the finished product.

Fifth, grinding, cleaning, drying and sample testing the sintered finished product, and calculating the percentage of the perovskite phase by using the XRD results to obtain less than 100% perovskite phase (Table 1).

Comparative Example 4

Firstly, one-step synthesis by a solid phase method:

Raw materials required for calculation based on the chemical formula of $0.06[Sr_{0.4}Pb_{0.6}Ti_{0.98}Zr_{0.02}O_3]$-$0.94[Pb(Mg_{1/3}Nb_{2/3})O_3]$.

Materials were mixed by wet ball milling, dried, and sieved after drying.

The mixed raw materials were incubated at 800 C-810 C for 4 hours to synthesize $0.06[Sr_{0.4}Pb_{0.6}Ti_{0.98}Zr_{0.02}O_3]$-0.94 $[Pb(Mg_{1/3}Nb_{2/3})O_3$;

The synthesized powder was finely ground, and the details were the same as those in comparative example 3.

Wet fine grinding for 24 hours, discharging and drying;

Oven dry and sieving, preferably 40 mesh sieve to sieve that above mix raw materials.

PVA with the mass of 5%-8% of that of the powder was added for granulation, and the powder was pressed and formed under the pressure of 200 MPa.

Thirdly, the pressed green compact is insulated at 650 DEG C. for 2 hours to eliminate organic substances in the green compact, and the plastic discharge rate is not more than 3 DEG C./min.

Fourth, the plastic-discharged sample was placed into an alumina crucible for closed sintering. In order to prevent the volatilization of the lead component, the green body was covered with powder having the same component, and a grinding cap was covered. The temperature was raised to 1215 C at a rate of 5 C/min for 2 hours, followed by furnace cooling to obtain the finished product.

Fifth, after the sintered finished product was ground, washed, dried, and subjected to sample test, the percentage of the perovskite phase was calculated using the XRD results, and no 100% perovskite phase was obtained (Table 1).

Comparative Example 5

Firstly, one-step synthesis by a solid phase method:

The raw material synthesis ingredient of $Bi_2O_3$, $CeO_2$, $Fe_2O_3$, $BaCO_3$, $TiO_2$, $Li_2CO_3$, $Pb_3O_4$, $ZrO_2$, MgO and $Nb_2O_5$ required for calculation according to the chemical formula composition of $0.01[0.67Bi_{0.995}Ce_{0.005}FeO_3$-$0.33BaTiO_3]$-$0.06[Li_{0.4}Pb_{0.6}Ti_{0.98}Zr_{0.02}O_{2.98}]$-$0.93[Pb(Mg_{1/3}Nb_{2/3})O_3$.

Materials were mixed by wet ball milling, dried, and sieved after drying.

The mixed raw materials were incubated at 800 C-810 C for 4 hours to synthesize $0.01[0.67Bi_{0.995}Ce_{0.005}FeO_3$-$0.33BaTiO_3]$-$0.06[Li_{0.4}Pb_{0.6}Ti_{0.98}Zr_{0.02}O_{2.98}]$-$0.93Pb(Mg_{1/3}Nb_{2/3})O_3$;

Fine grinding the synthesized powder, and the details are the same as above.

wet fine grinding for 24 hours, discharging and drying;

Oven dry and sieving, preferably 40 mesh sieve to sieve that above mix raw materials.

PVA with the mass of 5%-8% of that of the powder was added for granulation, and the powder was pressed and formed under the pressure of 200 MPa.

Third, the pressed green compact is insulated at 650 C for 2 hours to eliminate organic substances in the green compact, and the plastic discharge rate is not more than 3 C/min.

Fourth, the plastic-discharged sample was placed into an alumina crucible for closed sintering. In order to prevent the volatilization of the lead component, the green body was covered with powder having the same component, and a grinding cap was covered. The temperature was raised to 1215 C at a rate of 5 C/min for 2 hours, followed by furnace cooling to obtain the finished product.

Fifth, grinding, cleaning, drying and sample testing the sintered finished product, and calculating the percentage of the perovskite phase by using the XRD results to obtain less than 100% perovskite phase (Table 1).

Effect Example 1

The preparation results of Example 1 and Example 2, and Comparative Examples 1 to 5 were tested, and the following results were obtained.

TABLE 1

Final Product Preparation Results

| | Experimental examples | | | | | | |
|---|---|---|---|---|---|---|---|
| | Example 1 | Example 2 | Comparative Example 1 | Comparative Example 2 | Comparative Example 3 | Comparative Example 4 | Comparative Example 5 |
| Percentage of perovskite phase in ceramic materials | 100% | 100% | 100% | 75% | 78% | 72% | 88% |

Table 1 shows that single-phase ceramics having a perovskite structure can be obtained with the same doping elements as those in Example 1, Example 2, and Comparative Example 1; In comparative example 2, doping elements such as Ba, Sr, and Zr are missing, in comparative example 3, doping elements such as Sr and Zr are missing, in comparative example 4, doping elements such as Bi, Ce, Fe, and Ba are missing, and in comparative example 5, single-phase ceramics having a perovskite structure cannot be obtained by one-step solid-phase method after replacing Sr element with li element.

Thus, after changing the doping elements in the examples, the final single-phase ceramic of the perovskite structure could not be obtained by sintering the powder obtained by the one-step solid-phase method.

Effect Example 2

The preparation conditions of example 1, example 2 and comparative example 1 are summarized and the results are shown in table 2.

TABLE 2

Preparation Conditions

| Experimental examples | Example 1 | Example 2 | Comparative Example 1 |
|---|---|---|---|
| Have you obtained ceramic materials with a single perovskite structure | correct | correct | correct |
| Preparation temperature of ceramic powder | 800 C.~810 C. | 800 C.~810 C. | The first step: 1150 C.<br>Step 2: 835 C. |
| Ceramic powder insulation time | 4 hour | 4 hour | The first step: 2 hour<br>Step 2: 4 hour |

As can be seen from table 2, the time for preparing the ceramic powder in example 1 and example 2 was short, the temperature was lower, and the resources were more saved under the condition that other preparation conditions were not changed.

Effect Example 3

The ceramic materials obtained in example 1, example 2 and comparative example 1 were subjected to dielectric properties and ferroelectric properties under a strong field. The dielectric properties were tested by precision LCR (Agilent 4284A, Agilent) and the results are shown in Table 3.

TABLE 3

Relative dielectric constant and dielectric loss of samples at room temperature (25 degrees)

| | Test frequency | 1 kHz | 10 kHz | 100 kHz | 1 MHz |
|---|---|---|---|---|---|
| Example 1 | relative dielectric constant | 22986 | 22830 | 22541 | 22271 |
| | Dielectric loss | 0.0138 | 0.0159 | 0.0189 | 0.0216 |
| Example 2 | relative dielectric constant | 21161 | 21038 | 20877 | 20258 |
| | Dielectric loss | 0.0081 | 0.0089 | 0.0092 | 0.0122 |
| Comparative Example 1 | relative dielectric constant | 11954 | 11750 | 9856 | 9087 |
| | Dielectric loss | 0.0324 | 0.0378 | 0.0395 | 0.0476 |

Table 3 shows that the ceramic material obtained in Example 1 has a relative dielectric constant of more than 22,000 and a dielectric loss of less than 0.0217 at room temperature; The ceramic material obtained in example 2 has a relative dielectric constant of more than 20,000 and a dielectric loss of less than 0.0123 at room temperature; The ceramic material obtained in comparative example 1 had a relative dielectric constant of much less than 20,000 at room temperature and a dielectric loss higher than 0.03.

In addition, the ceramic ferroelectric properties of the ceramic materials obtained in example 1 and example 2 were also measured using TF Analyzer 2000 hysteresis loop meter from aixACCT, Germany.

Figure 3:
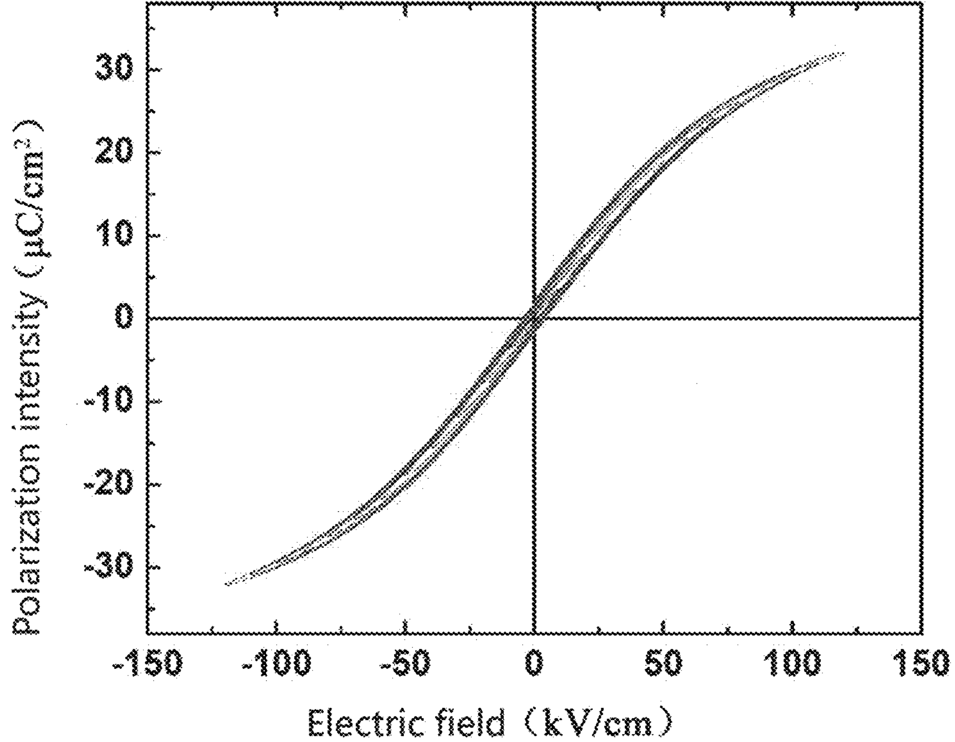
FIG. 3 is a room temperature hysteresis loop diagram of a ceramic material prepared by the method for preparing ceramic material of ceramic electrode for TTF provided by the invention.
Figure 6:
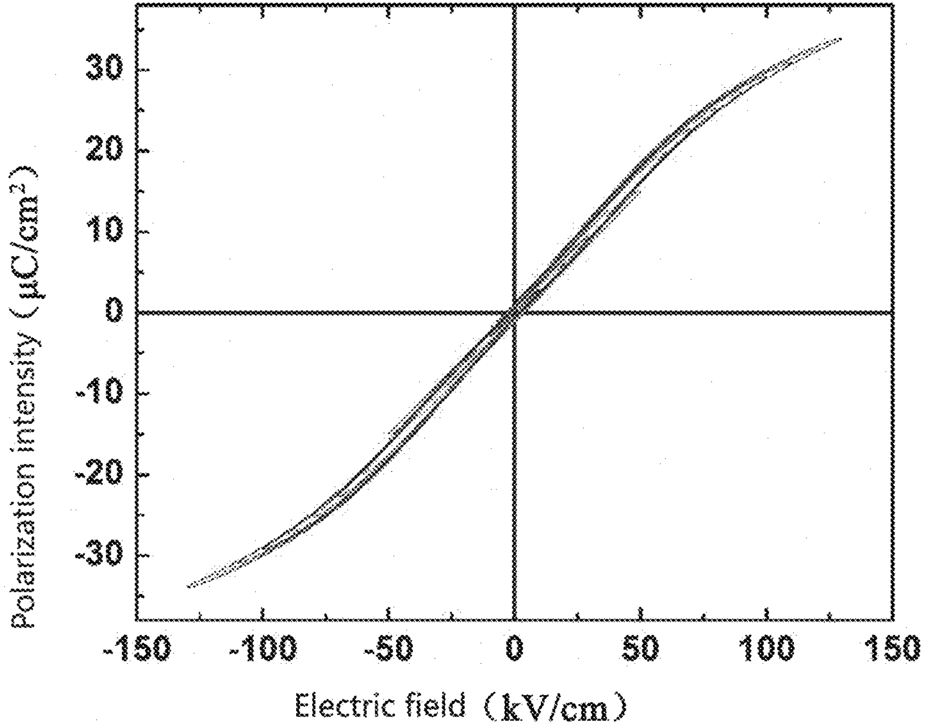
FIG. 6 is a room temperature hysteresis loop diagram of another ceramic material prepared by the method for preparing ceramic material of ceramic electrode for TTF provided by the invention.

Ferroelectric properties of the ceramic material obtained in example 1 referring to FIG. 3, the resulting ceramic hysteresis loops were measured at a frequency of 10 hz. Under different test voltages, the return lines are very thin and the strong field loss is very small. The sample is not broken down when an alternating current field greater than 115 KV/cm is applied; Ferroelectric properties of the ceramic material obtained in example 2 referring to FIG. 6, at a frequency of 10 hz, the obtained return lines were very fine and the strong field loss was small at different test voltages. The sample is not punctured when an alternating current field greater than 125 KV/cm is applied.

In addition, compared with the method for preparing the ferroelectric ceramic material $[[Pb(Mg_{1/3}Nb_{2/3})O_{3-x}Pb_{1-y}Li_{0.5y}Na_{0.5y}Ti_{1-y}Nb_yO_3]$ disclosed in the China invention patent with the authorization publication number CN106946569B, the method provided by the invention has the following advantages:

1, that one-step synthesis method is use for replacing the two-step synthesis method, so that the production cost of time, energy consumption, synthesis furnace life and the like are saved.

2. the room temperature dielectric constant increases from less than 13,000 to more than 20,000 at 1 MHz, and the loss decreases from more than 0.03 to less than 0.03.

3. the high-field ferroelectric properties are significantly improved, and the hysteresis loop area becomes smaller, which represents the reduction of high-field energy consumption. Moreover, the withstand voltage strength is increased from 50 kV/cm to more than 100 kV/cm.

The invention claimed is:

1. A method for preparing ceramic material of ceramic electrode for tumor treating fields, wherein the preparation method comprises the following steps:

1) synthesizing $a[0.67Bi_{0.995}Ce_{0.005}FeO_3\text{-}0.33BaTiO_3]\text{-}b[Sr_{1-x}Pb_xTi_{1-y}Zr_yO_3]\text{–}c[Pb(Mg_{1/3}Nb_{2/3})O_3]$ in one step by a solid phase method:

synthesizing $a[0.67Bi_{0.995}Ce_{0.005}FeO_3\text{-}0.33BaTiO_3]\text{-}b[Sr_{1-x}Pb_xTi_{1-y}Zr_yO_3]\text{–}c[Pb(Mg_{1/3}Nb_{2/3})O_3]$ powder by taking $Bi_2O_3$, $CeO_2$, $Fe_2O_3$, $BaCO_3$, $TiO_2$, $SrCO_3$, $Pb_3O_4$, $ZrO_2$, MgO, $Nb_2O_5$ as raw materials under the temperature of 750 DEG C. to 850 DEG C. for 4 hours; Where $0<a<0.06$, $0.05<b<0.18$, $a+b+c=1$; $0.6\leq x\leq 0.8$, $0<y<0.2$;

2) carrying out fine grinding on the $a[0.67Bi_{0.995}Ce_{0.005}FeO_3\text{-}0.33BaTiO_3]\text{-}b[Sr_{1-x}Pb_xTi_{1-y}Zr_yO_3]\text{-}c[Pb(Mg_{1/3}Nb_{2/3})O_3]$ powder synthesized in the step 1), adding a binder for granulation after fine grinding, and carrying out compression molding to obtain a biscuit;

3) performing plastic discharge to remove organic substances in the biscuit; and 4) sintering that biscuit to obtain a ceramic material.

2. The preparation method according to claim 1, wherein step 1) comprises:

taking $Bi_2O_3$, $CeO_2$, $Fe_2O_3$, $BaCO_3$, $TiO_2$, $SrCO_3$, $Pb_3O_4$, $ZrO_2$, MgO, $Nb_2O_5$ as raw materials, proportioning according to the stoichiometric ratio of $a[0.67Bi_{0.995}Ce_{0.005}FeO_3\text{-}0.33BaTiO_3]\text{-}b[Sr_{1-x}Pb_xTi_{1-y}Zr_yO_3]\text{-}c[Pb(Mg_{1/3}Nb_{2/3})O_3]$ and mixing by a wet ball milling method;

drying that mixed material;

keeping the temperature for 4 hours at the temperature of 750-850 deg c to obtain $a[0.67Bi_{0.995}Ce_{0.005}FeO_3\text{-}0.33BaTiO_3]\text{-}b[Sr_{1-x}Pb_xTi_{1-y}Zr_yO_3]\text{-}c[Pb(Mg_{1/3}Nb_{2/3})O_3]$ powder;

where $0<a<0.06$, $0.05<b<0.18$, $a+b+c=1$; $0.6\leq x\leq 0.8$, $0<y<0.2$.

3. The preparation method according to claim 1, wherein in the step 2), the qualities of the ceramic powder, the grinding ball and the deionized water are as follows: ceramic powder: grinding ball: deionized water=1:(1.8-2):(0.6-0.8).

4. The preparation method according to claim 1, wherein the fine grinding time is 24 to 48 hours.

5. The preparation method according to claim 3, wherein the grinding balls are zirconia balls.

6. The preparation method according to claim 1, wherein in step 2), the binder is PVA; the addition amount of the binder is 5-8% of the mass of the ceramic powder.

7. The preparation method according to claim 1, wherein in the step 3), the temperature of the plastic discharge is 550 to 760 deg c, and the heat preservation time is 2 to 3 hours.

8. The preparation method according to claim 1, wherein step 4) comprises:

putting the biscuit into a crucible for close sintering, that sinter temperature is 1185-1250 deg c, the heating rate is 2 deg c/min-5 deg c/min, and the heat preservation time is 2-3 hours.

9. Ceramic material of ceramic electrode for tumor treating fields, prepared by the preparation method according to claim 1.

10. The ceramic material according to claim 9, wherein the ceramic material has a relative dielectric constant of greater than 20,000 and a dielectric loss of less than 0.0217 at room temperature when the frequency is in the range of 1 kHz to 1 MHz.

* * * * *